US011992458B2

(12) United States Patent
Marici et al.

(10) Patent No.: US 11,992,458 B2
(45) **Date of Patent: *May 28, 2024**

(54) VIAL STABILIZER BASE WITH VIAL ADAPTER

(71) Applicant: Becton Dickinson and Company Limited, Dun Laoghaire (IE)

(72) Inventors: Paul Paia Marici, Piscataway, NJ (US); Girum Yemane-Tekeste, Hackensack, NJ (US)

(73) Assignee: Becton Dickinson and Company Limited, Dun Laoghaire (IE)

( * ) Notice: Subject to any disclaimer, the term of this patent is extended or adjusted under 35 U.S.C. 154(b) by 649 days.

This patent is subject to a terminal disclaimer.

(21) Appl. No.: 17/174,131

(22) Filed: Feb. 11, 2021

(65) Prior Publication Data

US 2021/0161765 A1 Jun. 3, 2021

Related U.S. Application Data

(63) Continuation of application No. 16/006,046, filed on Jun. 12, 2018, now Pat. No. 10,945,920, which is a continuation of application No. 14/691,795, filed on Apr. 21, 2015, now Pat. No. 10,022,298.

(60) Provisional application No. 61/982,054, filed on Apr. 21, 2014.

(51) Int. Cl.
*A61J 1/16* (2023.01)
*A61J 1/20* (2006.01)

(52) U.S. Cl.
CPC ............... *A61J 1/16* (2013.01); *A61J 1/2055* (2015.05)

(58) Field of Classification Search
CPC ..... A61J 1/16; A61J 1/20; A61J 1/2003–2086
See application file for complete search history.

(56) References Cited

U.S. PATENT DOCUMENTS

| | | | |
|---|---|---|---|
| 4,436,125 | A | 3/1984 | Blenkush |
| 4,564,054 | A | 1/1986 | Gustavsson |
| 4,673,404 | A | 6/1987 | Gustavsson |
| 4,932,937 | A | 6/1990 | Gustavsson et al. |
| 5,052,725 | A | 10/1991 | Meyer et al. |
| 5,104,158 | A | 4/1992 | Meyer et al. |
| 5,122,129 | A | 6/1992 | Olson et al. |
| 5,280,876 | A | 1/1994 | Atkins |
| 5,290,254 | A | 3/1994 | Vaillancourt |
| 5,322,518 | A | 6/1994 | Schneider et al. |
| 5,334,188 | A | 8/1994 | Inoue et al. |

(Continued)

FOREIGN PATENT DOCUMENTS

| | | | |
|---|---|---|---|
| EP | 2462971 | A1 | 6/2012 |
| JP | 9290012 | A | 11/1997 |

(Continued)

*Primary Examiner* — Benjamin J Klein
(74) *Attorney, Agent, or Firm* — The Webb Law Firm

(57) ABSTRACT

A system includes a vial stabilizer base having a first body and a plurality of fingers projecting from the first body, with the plurality of fingers being annularly disposed about the first body, and a vial adapter having a second body and a plurality of arms projecting from the second body. The second body defines a passageway. The plurality of fingers of the vial stabilizer base defines a socket having a first seat configured to receive a vial and a second seat configured to receive the vial adapter.

20 Claims, 19 Drawing Sheets

(56) References Cited

U.S. PATENT DOCUMENTS

| | | | |
|---|---|---|---|
| 5,360,011 A | 11/1994 | McCallister | |
| 5,395,348 A | 3/1995 | Ryan | |
| 5,437,650 A | 8/1995 | Larkin et al. | |
| 5,464,123 A | 11/1995 | Scarrow | |
| 5,472,430 A | 12/1995 | Vaillancourt et al. | |
| 5,478,328 A | 12/1995 | Silverman et al. | |
| 5,487,728 A | 1/1996 | Vaillancourt | |
| 5,507,733 A | 4/1996 | Larkin et al. | |
| 5,509,911 A | 4/1996 | Cottone, Sr. et al. | |
| 5,545,152 A | 8/1996 | Funderburk et al. | |
| 5,607,392 A | 3/1997 | Kanner | |
| 5,609,584 A | 3/1997 | Gettig et al. | |
| 5,611,792 A | 3/1997 | Gustafsson | |
| 5,647,845 A | 7/1997 | Haber et al. | |
| 5,685,866 A | 11/1997 | Lopez | |
| 5,807,347 A | 9/1998 | Bonaldo | |
| 5,893,397 A | 4/1999 | Peterson et al. | |
| 5,897,526 A | 4/1999 | Vaillancourt | |
| 6,063,068 A | 5/2000 | Fowles et al. | |
| 6,089,541 A | 7/2000 | Weinheimer et al. | |
| 6,113,583 A | 9/2000 | Fowles et al. | |
| 6,132,404 A | 10/2000 | Lopez | |
| 6,139,534 A | 10/2000 | Niedospial, Jr. et al. | |
| 6,221,041 B1 | 4/2001 | Russo | |
| 6,221,056 B1 | 4/2001 | Silverman | |
| 6,343,629 B1 * | 2/2002 | Wessman | A61J 1/2089 141/383 |
| 6,358,236 B1 | 3/2002 | DeFoggi et al. | |
| 6,409,708 B1 | 6/2002 | Wessman | |
| 6,474,375 B2 | 11/2002 | Spero et al. | |
| 6,478,788 B1 | 11/2002 | Aneas | |
| 6,544,246 B1 | 4/2003 | Niedospial, Jr. | |
| 6,551,299 B2 | 4/2003 | Miyoshi et al. | |
| 6,585,695 B1 | 7/2003 | Adair et al. | |
| 6,599,273 B1 | 7/2003 | Lopez | |
| 6,610,040 B1 | 8/2003 | Fowles et al. | |
| 6,629,958 B1 | 10/2003 | Spinello | |
| 6,656,433 B2 | 12/2003 | Sasso | |
| 6,715,520 B2 | 4/2004 | Andreasson et al. | |
| 6,814,726 B1 | 11/2004 | Lauer | |
| 6,852,103 B2 | 2/2005 | Fowles et al. | |
| 6,875,203 B1 | 4/2005 | Fowles et al. | |
| 6,875,205 B2 | 4/2005 | Leinsing | |
| 6,911,025 B2 | 6/2005 | Miyahara | |
| 6,997,917 B2 | 2/2006 | Niedospial, Jr. et al. | |
| 7,040,598 B2 | 5/2006 | Raybuck | |
| 7,083,605 B2 | 8/2006 | Miyahara | |
| 7,097,209 B2 | 8/2006 | Unger et al. | |
| 7,261,707 B2 | 8/2007 | Frezza et al. | |
| 7,306,584 B2 | 12/2007 | Wessman et al. | |
| 7,326,194 B2 | 2/2008 | Zinger et al. | |
| 7,350,535 B2 | 4/2008 | Liepold et al. | |
| 7,354,427 B2 | 4/2008 | Fangrow | |
| 7,452,349 B2 | 11/2008 | Miyahara | |
| 7,547,300 B2 | 6/2009 | Fangrow | |
| 7,628,772 B2 | 12/2009 | McConnell et al. | |
| 7,648,491 B2 | 1/2010 | Rogers | |
| 7,658,734 B2 | 2/2010 | Adair et al. | |
| 7,743,799 B2 | 6/2010 | Mosler et al. | |
| 7,744,581 B2 | 6/2010 | Wallen et al. | |
| 7,758,560 B2 | 7/2010 | Connell et al. | |
| 7,803,140 B2 | 9/2010 | Fangrow, Jr. | |
| 7,857,805 B2 | 12/2010 | Raines | |
| 7,867,215 B2 | 1/2011 | Akerlund et al. | |
| 7,879,018 B2 | 2/2011 | Zinger et al. | |
| 7,900,659 B2 | 3/2011 | Whitley et al. | |
| 7,927,316 B2 | 4/2011 | Proulx et al. | |
| 7,942,860 B2 | 5/2011 | Horppu | |
| 7,975,733 B2 | 7/2011 | Horppu et al. | |
| 8,096,525 B2 | 1/2012 | Ryan | |
| 8,122,923 B2 | 2/2012 | Kraus et al. | |
| 8,123,738 B2 | 2/2012 | Vaillancourt | |
| 8,137,332 B2 | 3/2012 | Pipelka | |
| 8,167,863 B2 | 5/2012 | Yow | |
| 8,177,768 B2 | 5/2012 | Leinsing | |
| 8,196,614 B2 | 6/2012 | Kriheli | |
| 8,206,367 B2 | 6/2012 | Warren et al. | |
| 8,211,069 B2 | 7/2012 | Fangrow, Jr. | |
| 8,225,826 B2 | 7/2012 | Horppu et al. | |
| 8,226,628 B2 | 7/2012 | Muramatsu et al. | |
| 8,257,286 B2 | 9/2012 | Meyer et al. | |
| 8,267,127 B2 | 9/2012 | Kriheli | |
| 8,277,424 B2 | 10/2012 | Pan | |
| 8,317,741 B2 | 11/2012 | Kraushaar | |
| 8,317,743 B2 | 11/2012 | Denenburg | |
| 8,398,607 B2 | 3/2013 | Fangrow, Jr. | |
| 8,403,905 B2 | 3/2013 | Yow | |
| 8,425,487 B2 | 4/2013 | Beiriger et al. | |
| 8,449,521 B2 | 5/2013 | Thorne, Jr. et al. | |
| 8,454,579 B2 | 6/2013 | Fangrow, Jr. | |
| 10,022,298 B2 * | 7/2018 | Marici | A61J 1/16 |
| 10,945,920 B2 * | 3/2021 | Marici | A61J 1/2055 |
| 2003/0070726 A1 | 4/2003 | Andreasson et al. | |
| 2004/0199139 A1 | 10/2004 | Fowles et al. | |
| 2005/0065495 A1 | 3/2005 | Zambaux | |
| 2005/0182383 A1 | 8/2005 | Wallen | |
| 2005/0215976 A1 | 9/2005 | Wallen | |
| 2006/0108319 A1 | 5/2006 | Meittunen | |
| 2007/0079894 A1 | 4/2007 | Kraus et al. | |
| 2007/0108205 A1 * | 5/2007 | Porras | A61J 1/1412 220/23.87 |
| 2008/0045919 A1 | 2/2008 | Jakob et al. | |
| 2008/0287914 A1 | 11/2008 | Wyatt et al. | |
| 2009/0159485 A1 | 6/2009 | Jakob et al. | |
| 2010/0179506 A1 | 7/2010 | Shemesh et al. | |
| 2010/0217226 A1 | 8/2010 | Shemesh | |
| 2011/0004183 A1 | 1/2011 | Carrez et al. | |
| 2011/0062703 A1 | 3/2011 | Lopez et al. | |
| 2011/0074148 A1 | 3/2011 | Imai | |
| 2011/0106046 A1 | 5/2011 | Hiranuma et al. | |
| 2011/0257621 A1 | 10/2011 | Fangrow | |
| 2011/0291406 A1 | 12/2011 | Kraft et al. | |
| 2012/0035580 A1 | 2/2012 | Fangrow | |
| 2012/0046635 A1 | 2/2012 | Hedgepeth et al. | |
| 2012/0046636 A1 | 2/2012 | Kriheli | |
| 2012/0123381 A1 | 5/2012 | Kraus et al. | |
| 2012/0192968 A1 | 8/2012 | Bonnal et al. | |
| 2012/0192976 A1 | 8/2012 | Rahimy et al. | |
| 2012/0203193 A1 | 8/2012 | Rogers | |
| 2012/0265163 A1 | 10/2012 | Cheng et al. | |
| 2012/0279884 A1 | 11/2012 | Tennican et al. | |
| 2012/0316536 A1 | 12/2012 | Carrez et al. | |
| 2013/0006211 A1 | 1/2013 | Takemoto | |
| 2013/0012908 A1 | 1/2013 | Yeung | |
| 2013/0066293 A1 | 3/2013 | Garfield et al. | |
| 2013/0072893 A1 | 3/2013 | Takemoto | |
| 2013/0076019 A1 | 3/2013 | Takemoto | |
| 2013/0079744 A1 | 3/2013 | Okiyama et al. | |
| 2015/0164743 A1 | 6/2015 | Janson et al. | |
| 2015/0209230 A1 | 7/2015 | Lev et al. | |
| 2015/0209233 A1 | 7/2015 | Fukuoka | |

FOREIGN PATENT DOCUMENTS

| | | |
|---|---|---|
| WO | 2005011781 A1 | 2/2005 |
| WO | 2006103074 A1 | 10/2006 |
| WO | 2009024807 A1 | 2/2009 |
| WO | 2009090627 A1 | 7/2009 |
| WO | 2011050333 A1 | 4/2011 |
| WO | 2012069401 A1 | 5/2012 |
| WO | 2012119225 A1 | 9/2012 |
| WO | 2012168235 A1 | 12/2012 |
| WO | 2013025946 A1 | 2/2013 |
| WO | 2013054323 A1 | 4/2013 |
| WO | 2013066779 A1 | 5/2013 |
| WO | 2013115730 A1 | 8/2013 |
| WO | 2013179596 A1 | 12/2013 |
| WO | 2014008397 A2 | 1/2014 |
| WO | 2014033706 A1 | 3/2014 |
| WO | 2014122643 A1 | 8/2014 |
| WO | 2014181320 A1 | 11/2014 |
| WO | 2013150579 A1 | 12/2015 |

* cited by examiner

VIAL STABILIZER BASE WITH VIAL ADAPTER

CROSS-REFERENCE TO RELATED APPLICATION

This application is a continuation of U.S. patent application Ser. No. 16/006,046, filed Jun. 12, 2018, which is a continuation of U.S. patent application Ser. No. 14/691,795, filed Apr. 21, 2015 (now U.S. Pat. No. 10,022,298), which claims priority to U.S. Provisional Application Ser. No. 61/982,054, filed Apr. 21, 2014, each of which are hereby incorporated by reference in their entirety.

BACKGROUND OF THE INVENTION

Field of the Invention

The present disclosure relates generally to a vial stabilizer base with vial adapter. More particularly, the present disclosure relates to a vial stabilizer base with vial adapter that can be used with a system for the closed transfer of fluids, a closed system transfer device, or a vial content transfer device. The vial adapter enables the accommodation of vials of different sizes in a system for the closed transfer of fluids, a closed system transfer device, or a vial content transfer device.

Description of Related Art

Health care providers reconstituting, transporting, and administering hazardous drugs, such as cancer treatments, can put themselves at risk of exposure to these medications and present a major hazard in the health care environment. For example, nurses treating cancer patients risk being exposed to chemotherapy drugs and their toxic effects. Unintentional chemotherapy exposure can affect the nervous system, impair the reproductive system, and bring an increased risk of developing blood cancers in the future. In order to reduce the risk of health care providers being exposed to toxic drugs, the closed transfer of these drugs becomes important.

Some drugs must be dissolved or diluted before they are administered, which involves transferring a solvent from one container to a sealed vial containing the drug in powder or liquid form, by means of a needle. Drugs may be inadvertently released into the atmosphere in gas form or by way of aerosolization, during the withdrawal of the needle from the vial and while the needle is inside the vial if any differential pressure exists between the interior of the vial and the surrounding atmosphere.

SUMMARY OF THE INVENTION

In one aspect, a system includes a vial stabilizer base having a first body and a plurality of fingers projecting from the first body, with the plurality of fingers being annularly disposed about the first body, and a vial adapter configured to be secured to a medical vial having a second body and a plurality of arms projecting from the second body. The second body defines a passageway. The plurality of fingers of the vial stabilizer base defines a socket having a first seat configured to receive a vial and a second seat configured to receive the vial adapter.

The plurality of arms projecting from the second body may be configured to engage a vial. The plurality of arms projecting from the second body may be elastically deformable. The plurality of arms projecting from the second body may each comprise an angled surface configured to form a snap fit with the vial.

The vial adapter may be configured to enable attachment of a vial having a first size to a closed system transfer device configured to attach to a vial having a second size. The first size may be smaller than the second size.

The plurality of fingers projecting from the first body may include a first gripping ridge configured to grip a vial, and a second gripping ridge configured to grip the vial adapter. The first gripping ridge and the second gripping ridge each extend radially inward from at least one of the plurality of fingers projecting from the first body. The first gripping ridge may be positioned further radially inward relative to the second gripping ridge.

The plurality of fingers projecting from the first body may be elastically deformable. The vial adapter may further include at least one retaining tab extending radially inward from the second body and configured to engage a vial. The plurality of fingers projecting from the first body may be spaced radially inward from a circumferential edge of the first body.

In a further aspect, a vial stabilizer and vial adapter assembly includes a vial stabilizer base including a first body and a plurality of fingers projecting from the first body, with the plurality of fingers annularly disposed about the first body and defining a socket having a first seat configured to receive a vial and a second seat, and a vial adapter configured to be secured to a medical vial including a second body and a plurality of arms projecting from the second body. The second body defines a passageway. The vial adapter is at least partially received within the socket of the vial stabilizer base and engaged with the second seat of the vial stabilizer base.

The plurality of arms projecting from the second body may be configured to engage a vial. The plurality of arms projecting from the second body may be elastically deformable. The plurality of fingers projecting from the first body may include a first gripping ridge configured to grip a vial, and a second gripping ridge engaged with the vial adapter and releasably securing the vial adapter to the vial stabilizer base. The first gripping ridge and the second gripping ridge may each extend radially inward from at least one of the plurality of fingers projecting from the first body. The first gripping ridge may be positioned further radially inward relative to the second gripping ridge. The vial adapter may further include at least one retaining tab extending radially inward from the second body and configured to engage a vial. The plurality of fingers projecting from the first body may be spaced radially inward from a circumferential edge of the first body.

BRIEF DESCRIPTION OF THE DRAWINGS

The above-mentioned and other features and advantages of this disclosure, and the manner of attaining them, will become more apparent and the disclosure itself will be better understood by reference to the following descriptions of aspects of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 1A:
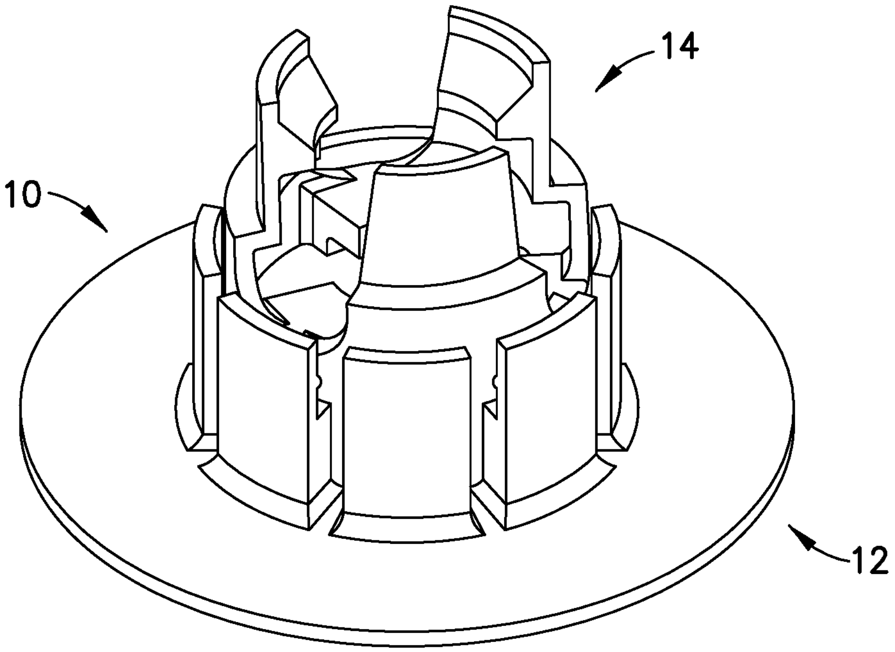
FIG. 1A is a perspective view of an assembled vial stabilizer base and vial adapter in accordance with an aspect of the present invention.
Figure 1B:
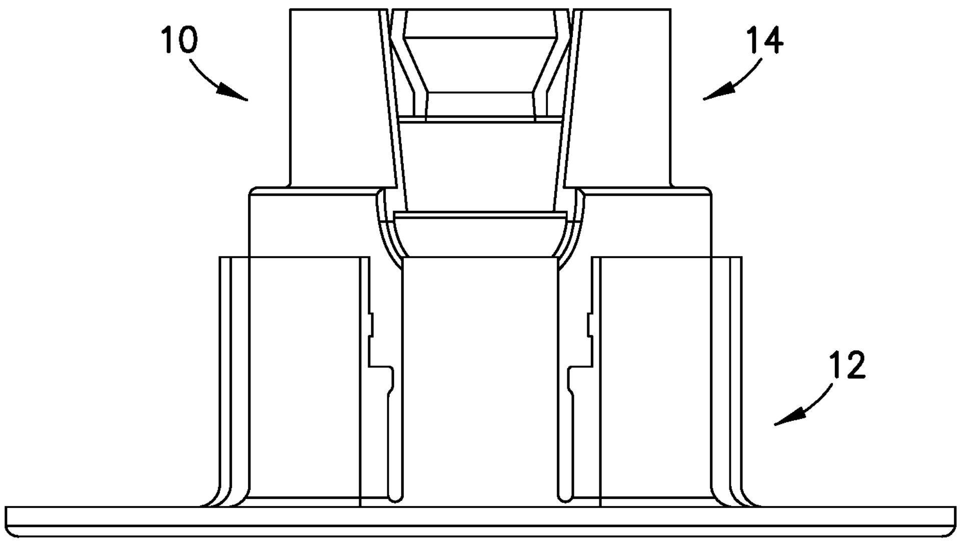
FIG. 1B is a side view of the assembled vial stabilizer base and vial adapter shown in FIG. 1A in accordance with an aspect of the present invention.
Figure 1C:
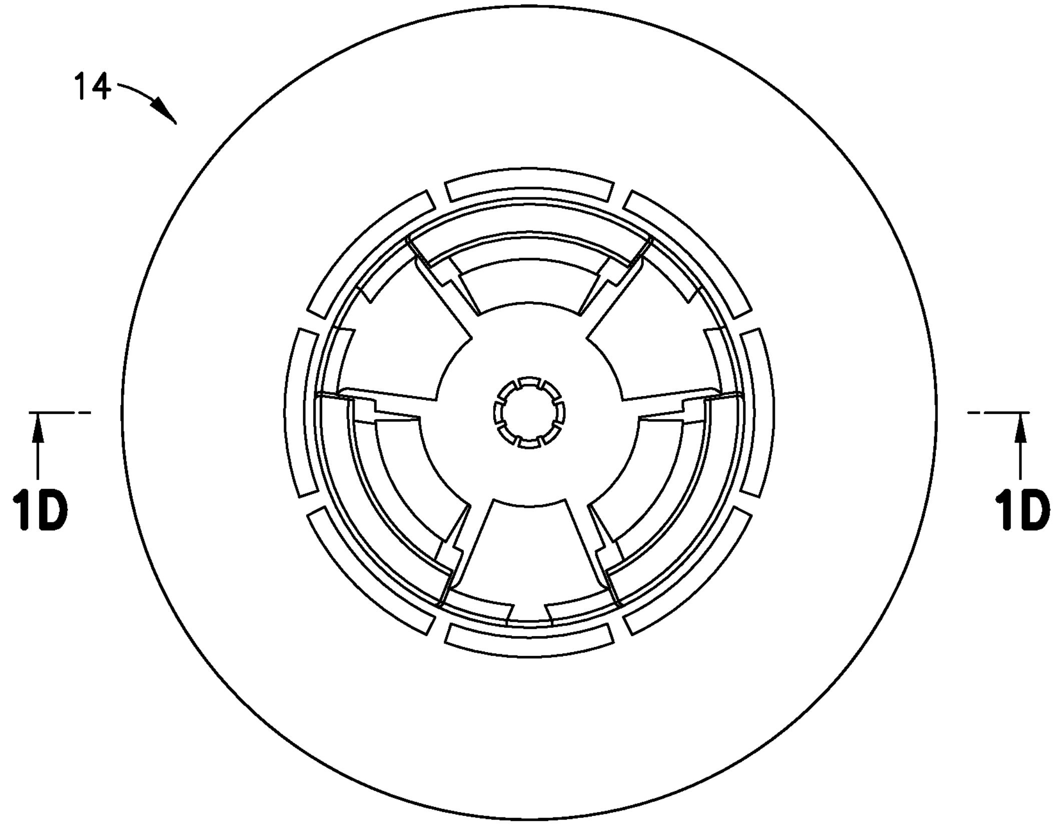
FIG. 1C is a top view of the assembled vial stabilizer base and vial adapter shown in FIG. 1A in accordance with an aspect of the present invention.
Figure 1D:
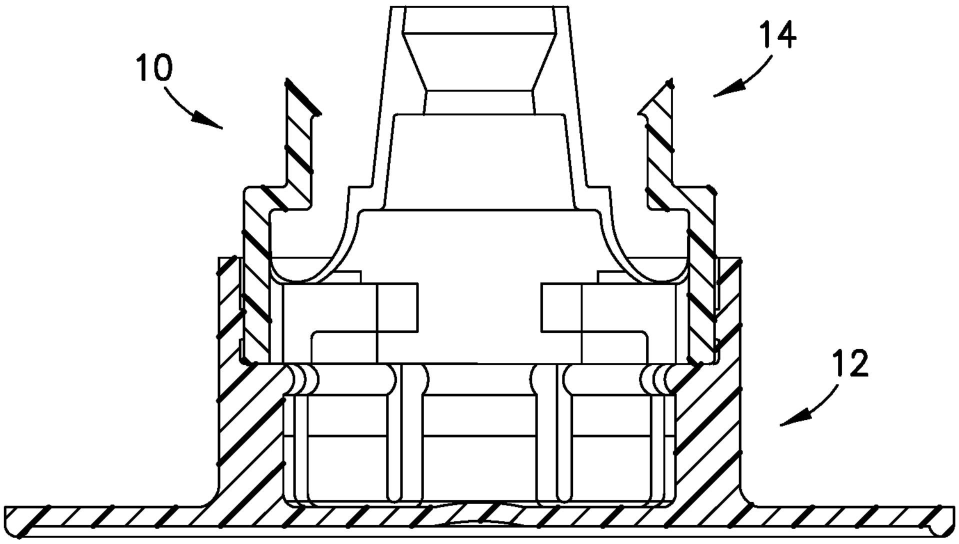
FIG. 1D is a cross-sectional view of the assembled vial stabilizer base and vial adapter taken along line 1D-1D shown in FIG. 1C in accordance with an aspect of the present invention.
Figure 2A:
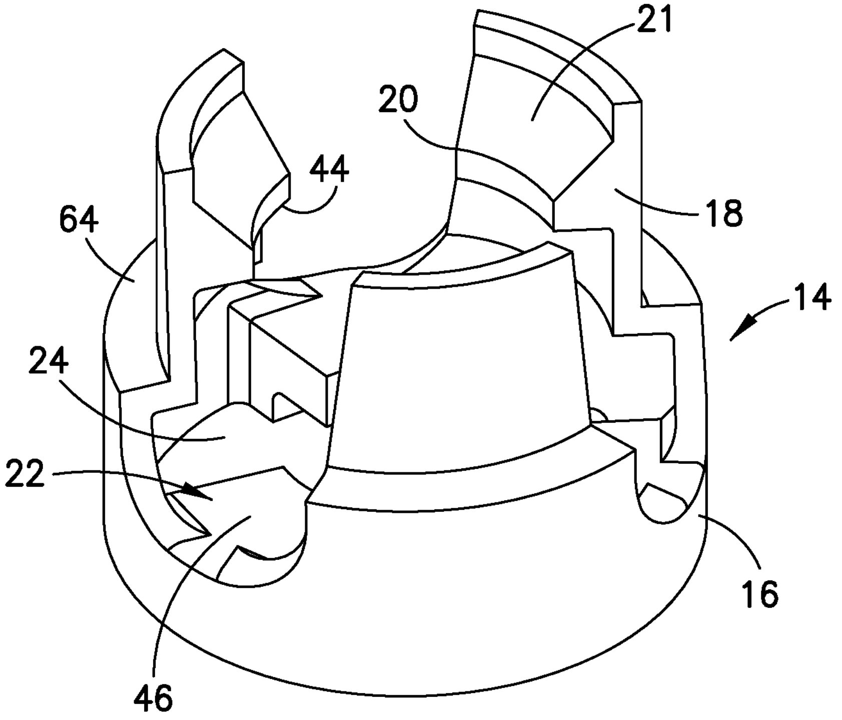
FIG. 2A is a perspective view of a vial adapter in accordance with an aspect of the present invention.
Figure 2B:
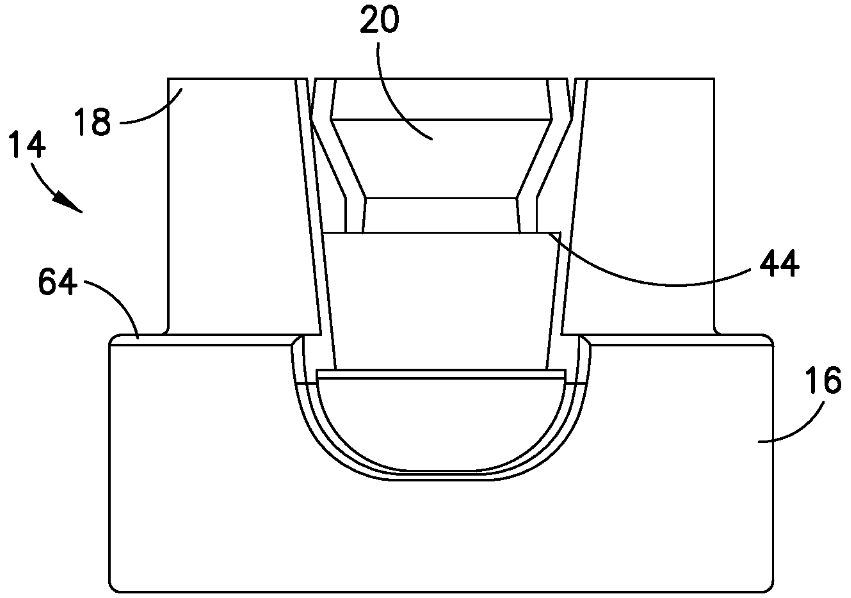
FIG. 2B is a side view of the vial adapter shown in FIG. 2A in accordance with an aspect of the present invention.
Figure 2C:
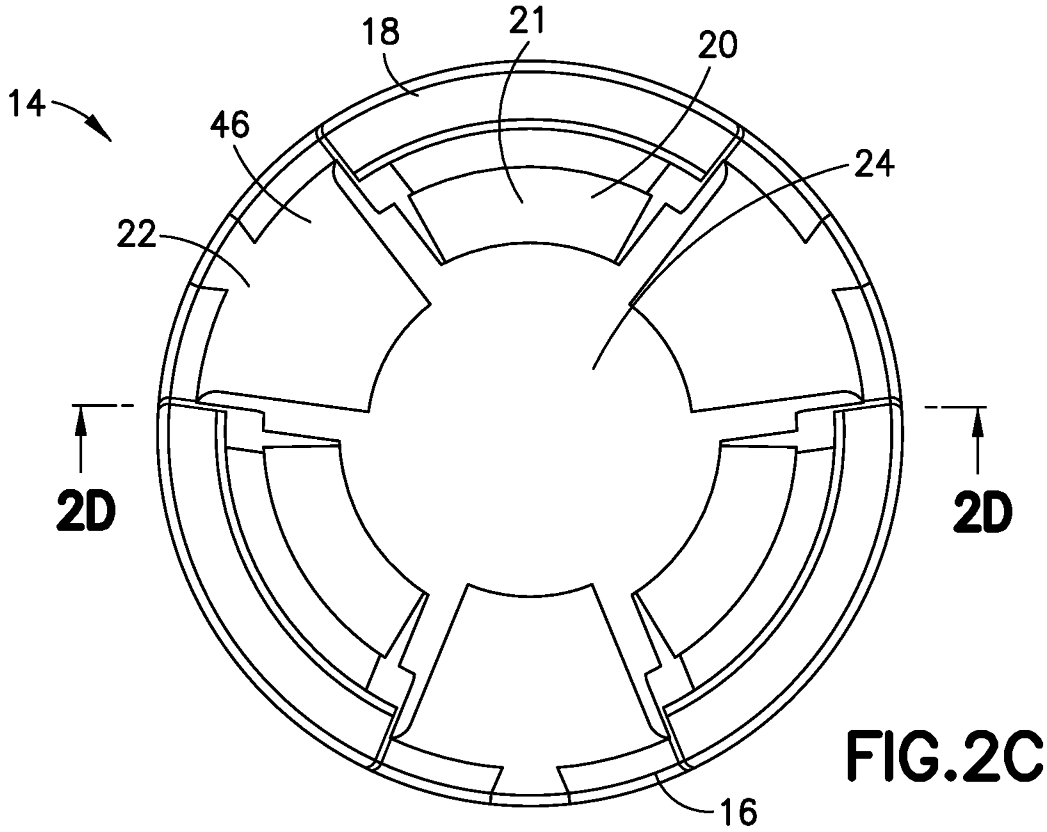
FIG. 2C is a top view of the vial adapter shown in FIG. 2A in accordance with an aspect of the present invention.
Figure 2D:
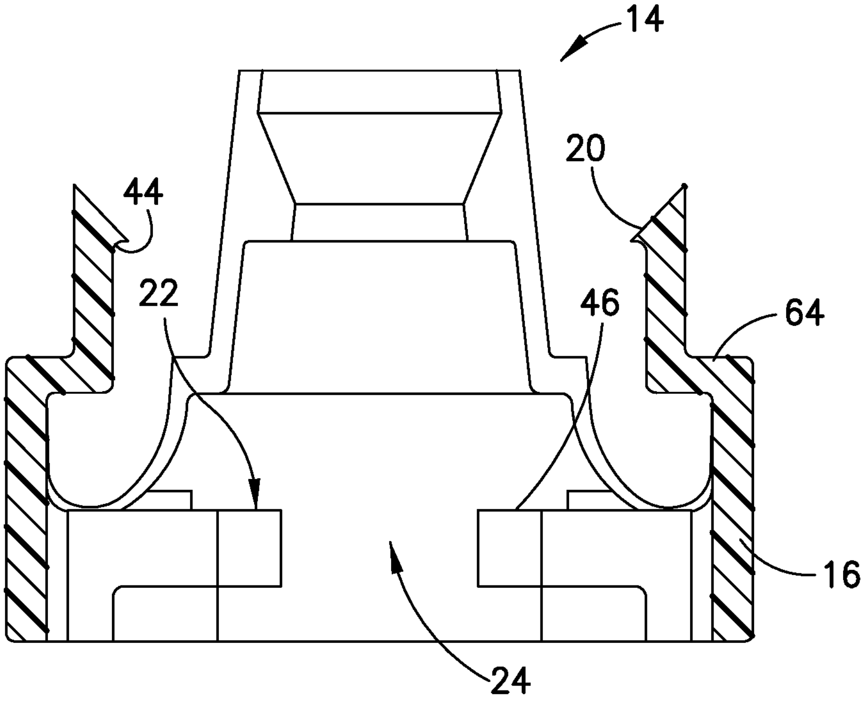
FIG. 2D is a cross-sectional view of the vial adapter taken along line 2D-2D shown in FIG. 2C in accordance with an aspect of the present invention.
Figure 2E:
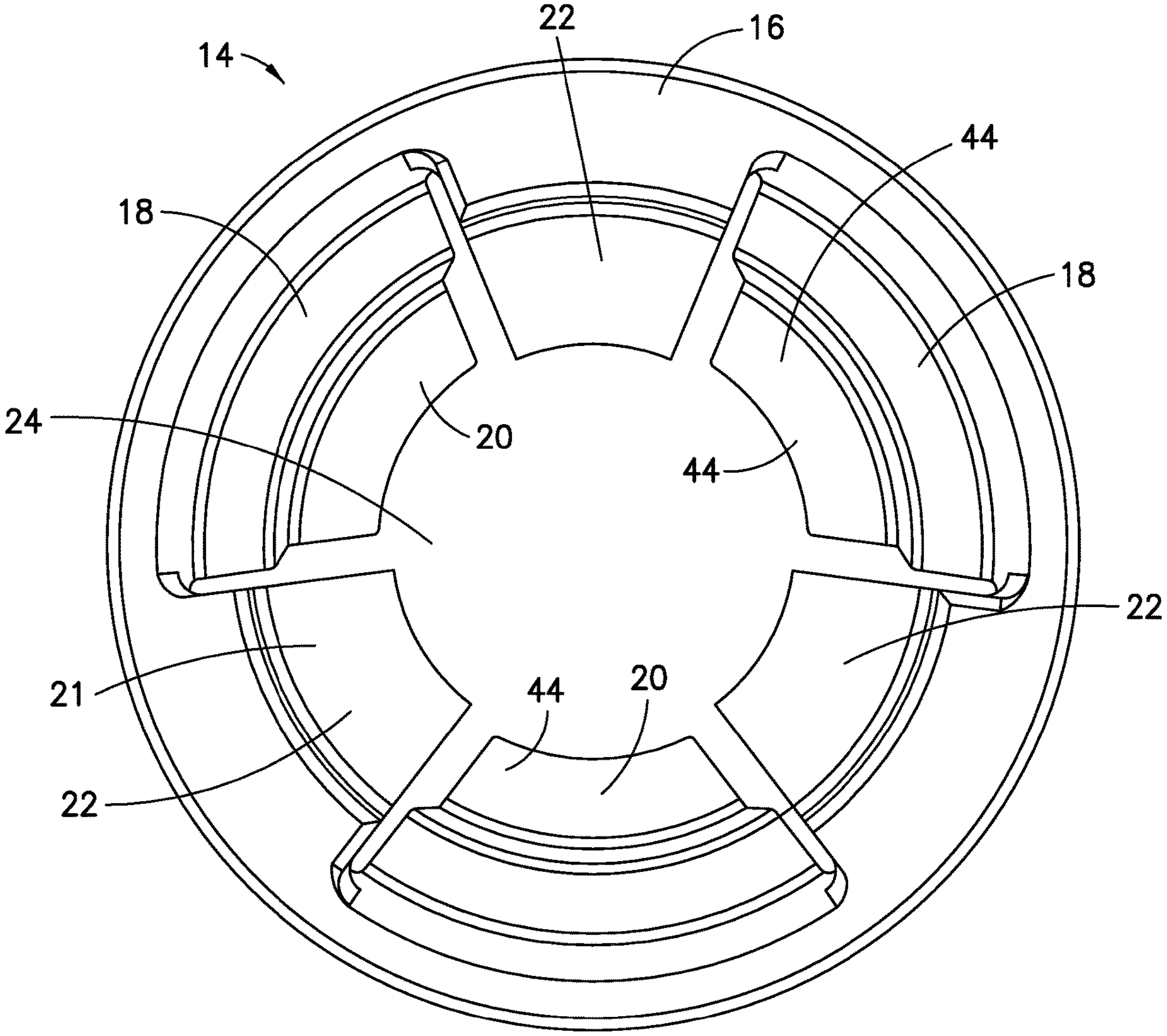
FIG. 2E is a bottom view of the vial adapter shown in FIG. 2A in accordance with an aspect of the present invention.
Figure 3A:
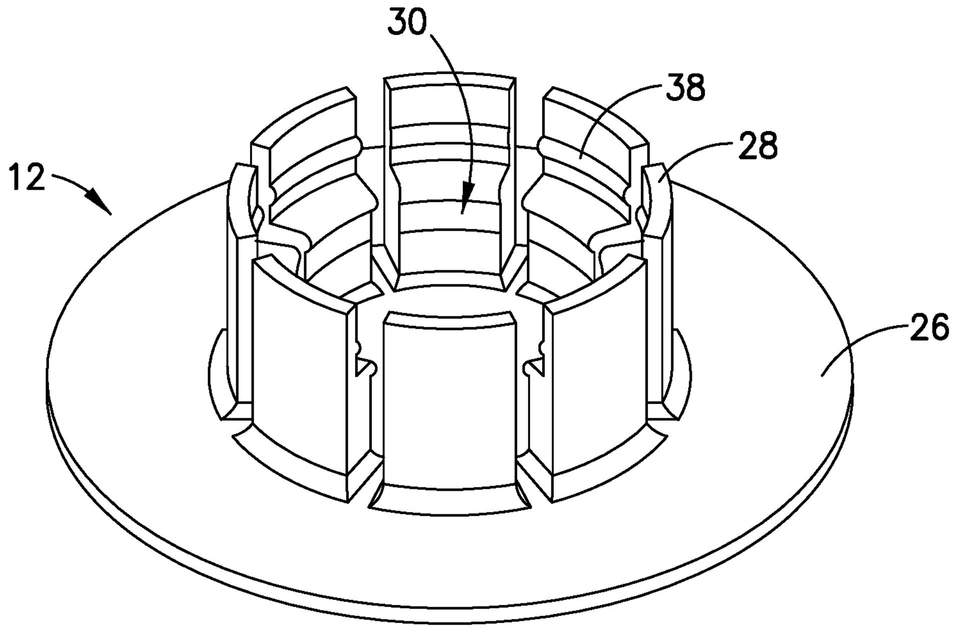
FIG. 3A is a perspective view of a vial stabilizer base in accordance with an aspect of the present invention.
Figure 3B:
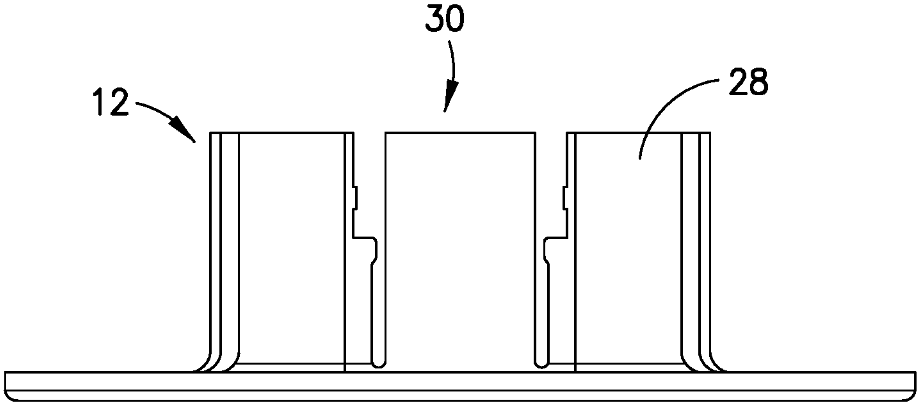
FIG. 3B is a side view of the vial stabilizer base shown in FIG. 3A in accordance with an aspect of the present invention.
Figure 3C:
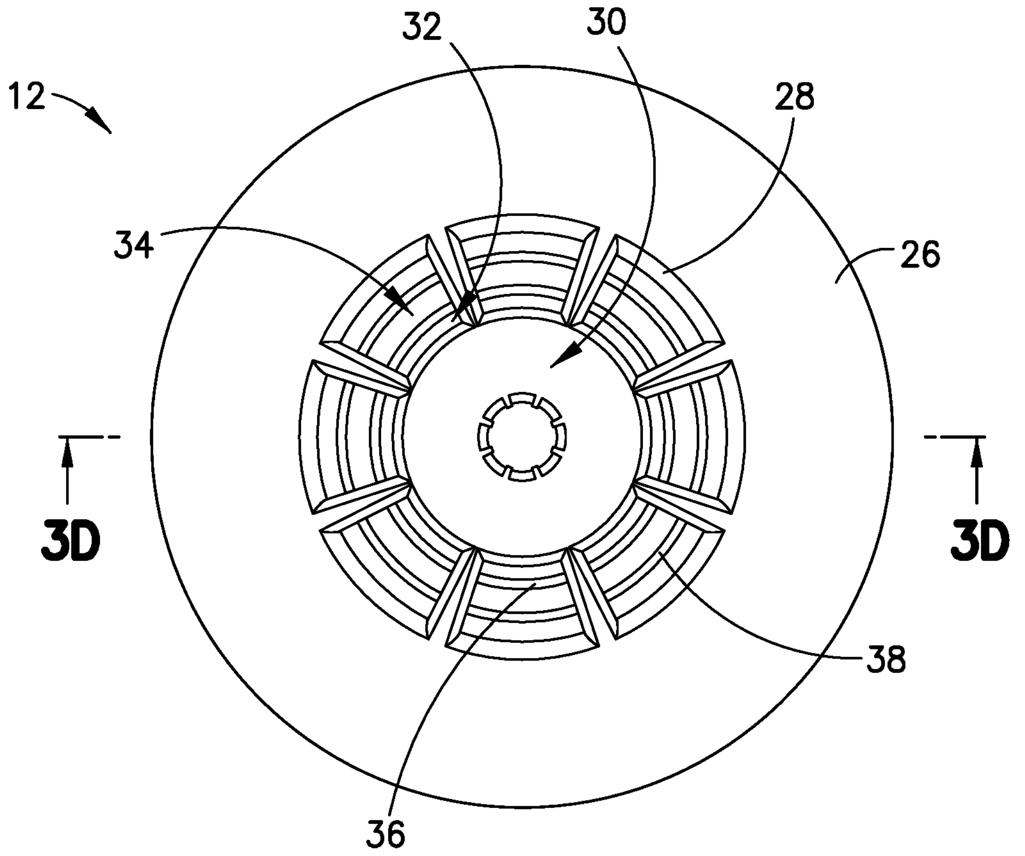
FIG. 3C is a top view of the vial stabilizer base shown in FIG. 3A in accordance with an aspect of the present invention.
Figure 3D:
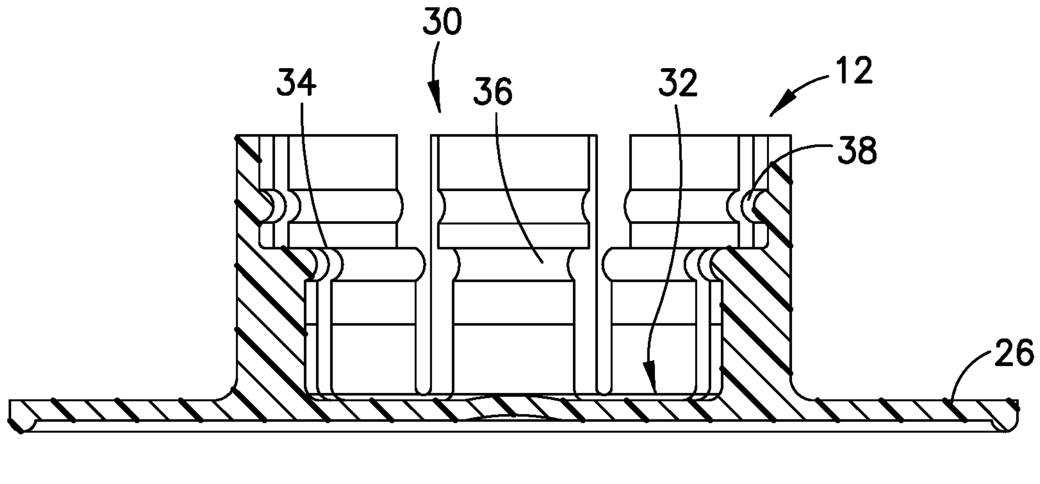
FIG. 3D is a cross-sectional view of the vial stabilizer base taken along line 3D-3D shown in FIG. 3C in accordance with an aspect of the present invention.
Figure 3E:
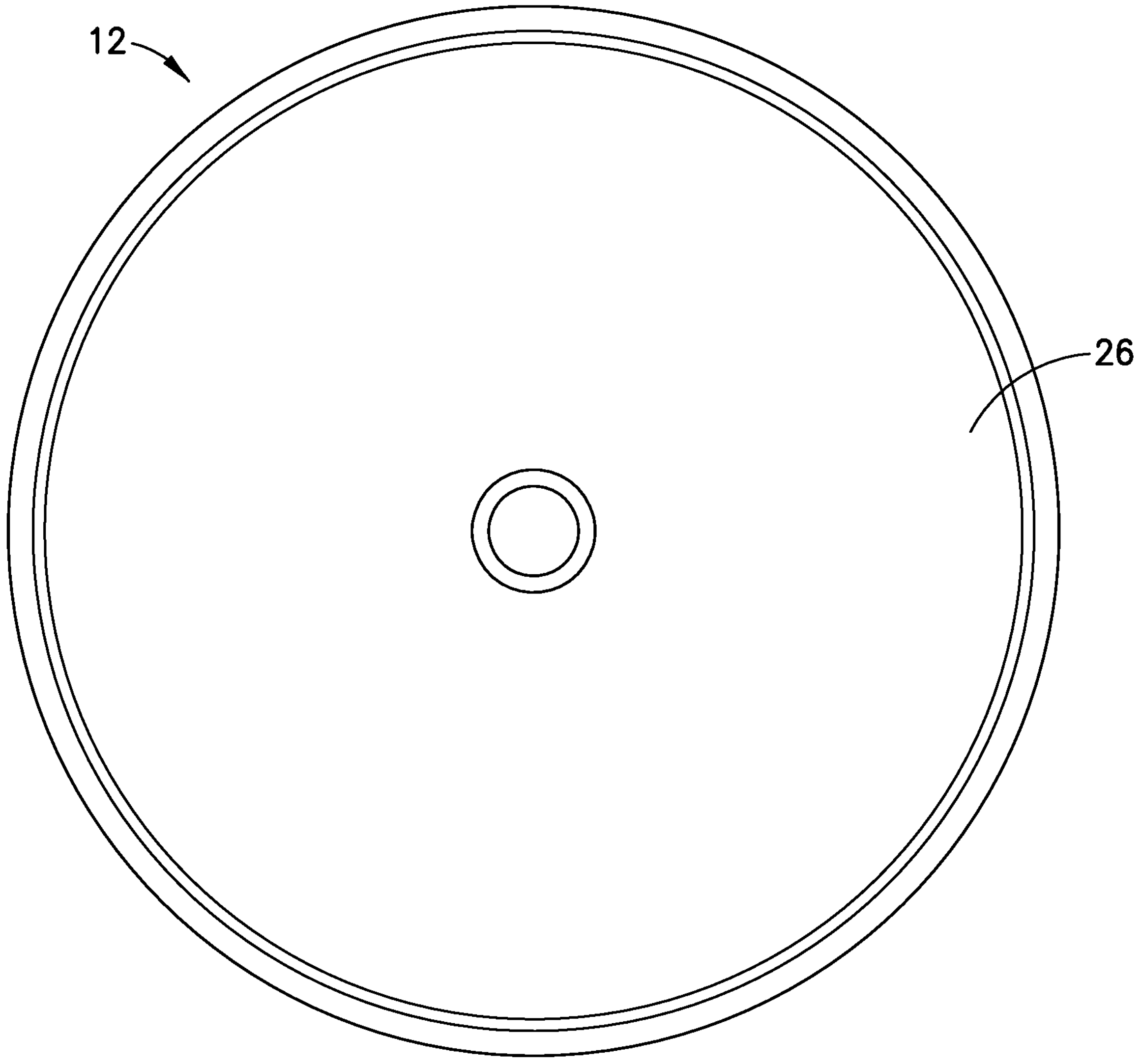
FIG. 3E is a bottom view of the vial stabilizer base shown in FIG. 3A in accordance with an aspect of the present invention.
Figure 4A:
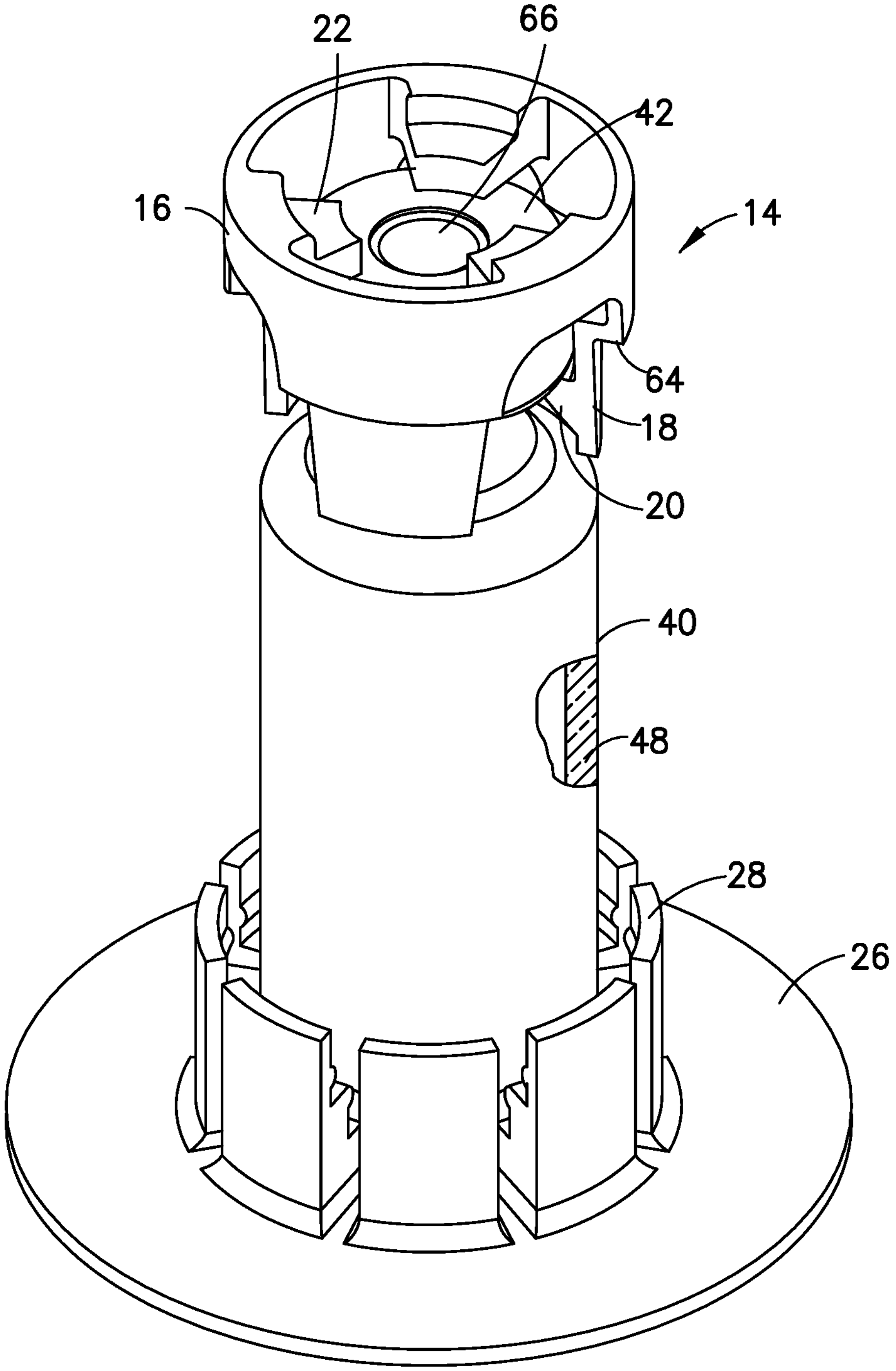
FIG. 4A is a perspective view of a vial stabilizer base and a vial adapter attached to a vial in accordance with an aspect of the present invention.
Figure 4B:
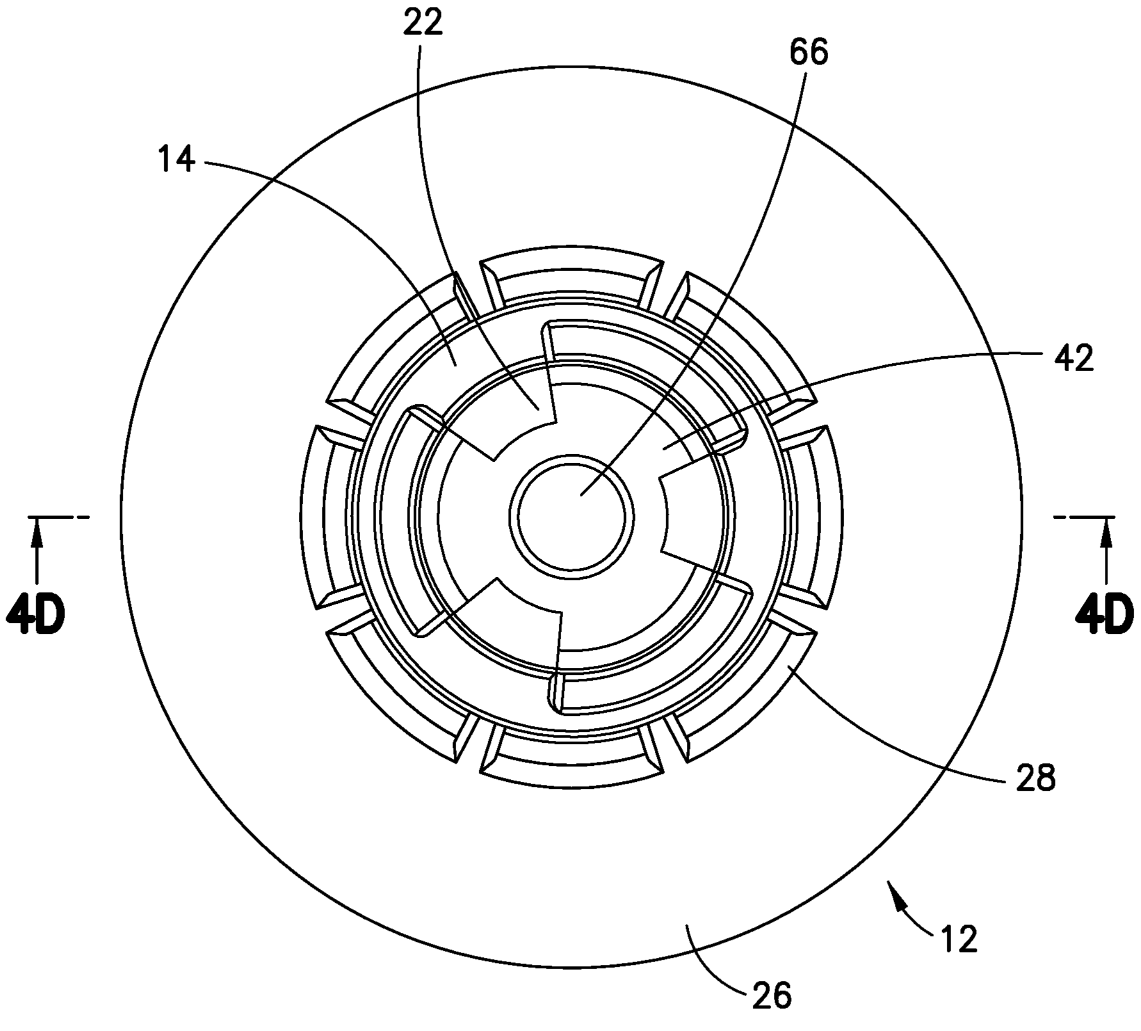
FIG. 4B is a top view of the vial stabilizer base and vial adapter shown in FIG. 4A in accordance with an aspect of the present invention.
Figure 4D:
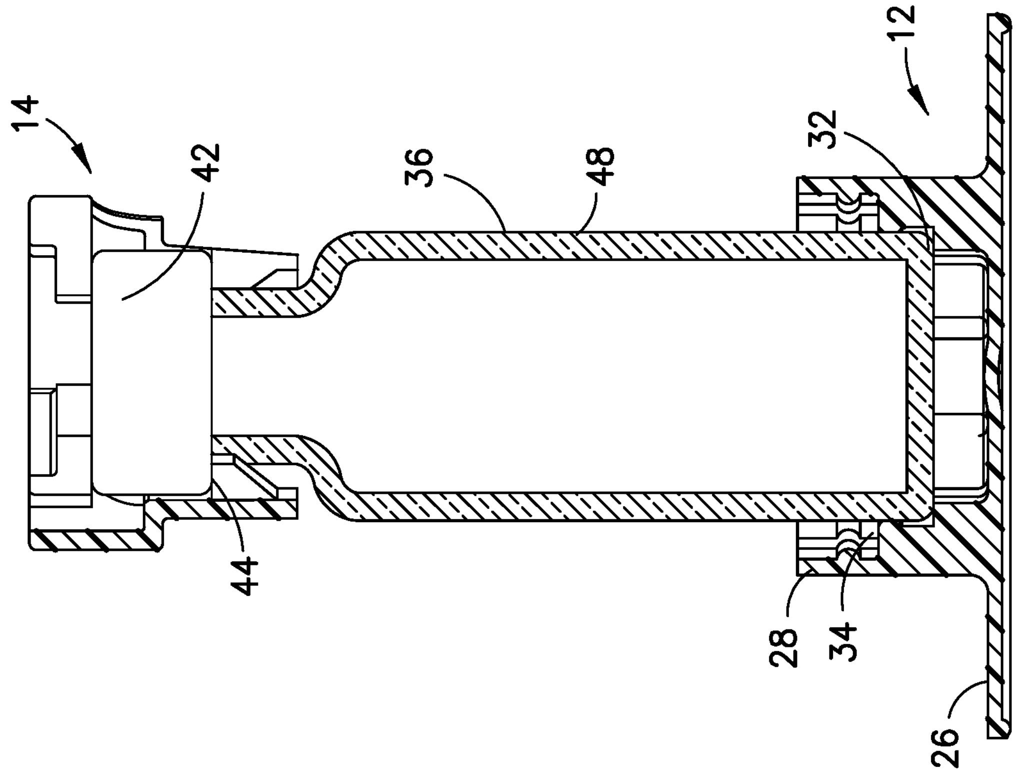
FIG. 4D is a cross-sectional view of the vial stabilizer base and vial adapter shown in FIG. 4A in accordance with an aspect of the present invention.
Figure 4C:
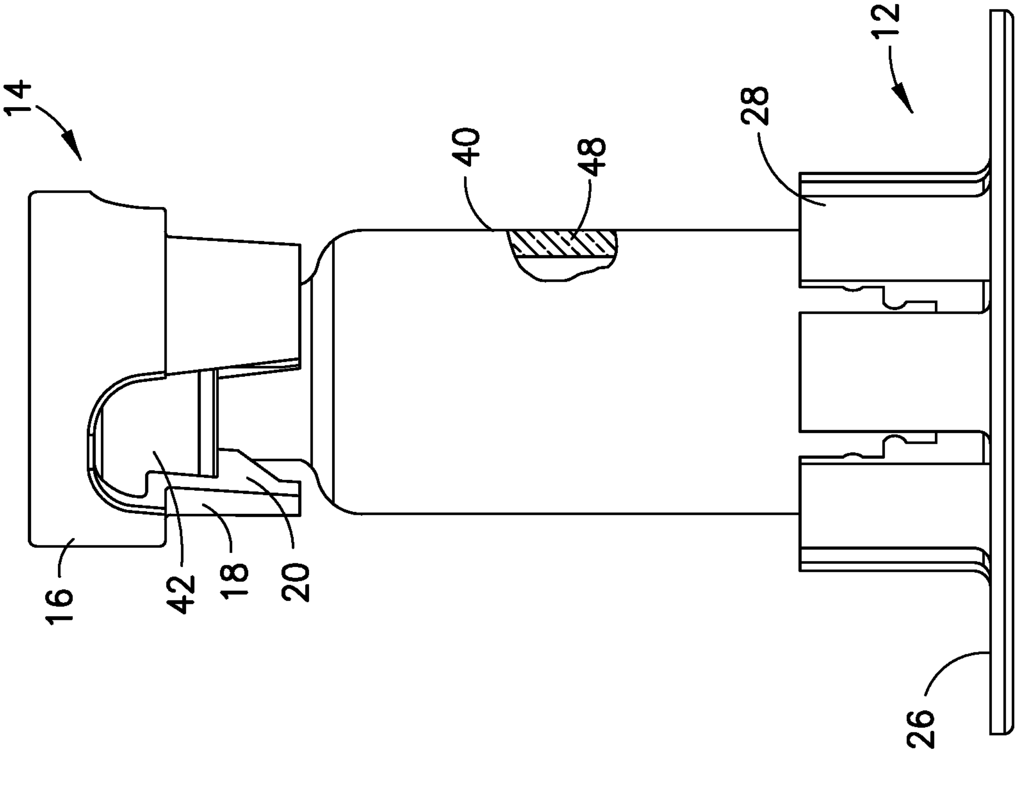
FIG. 4C is a side view of the vial stabilizer base and vial adapter shown in FIG. 4A in accordance with an aspect of the present invention.
Figure 5A:
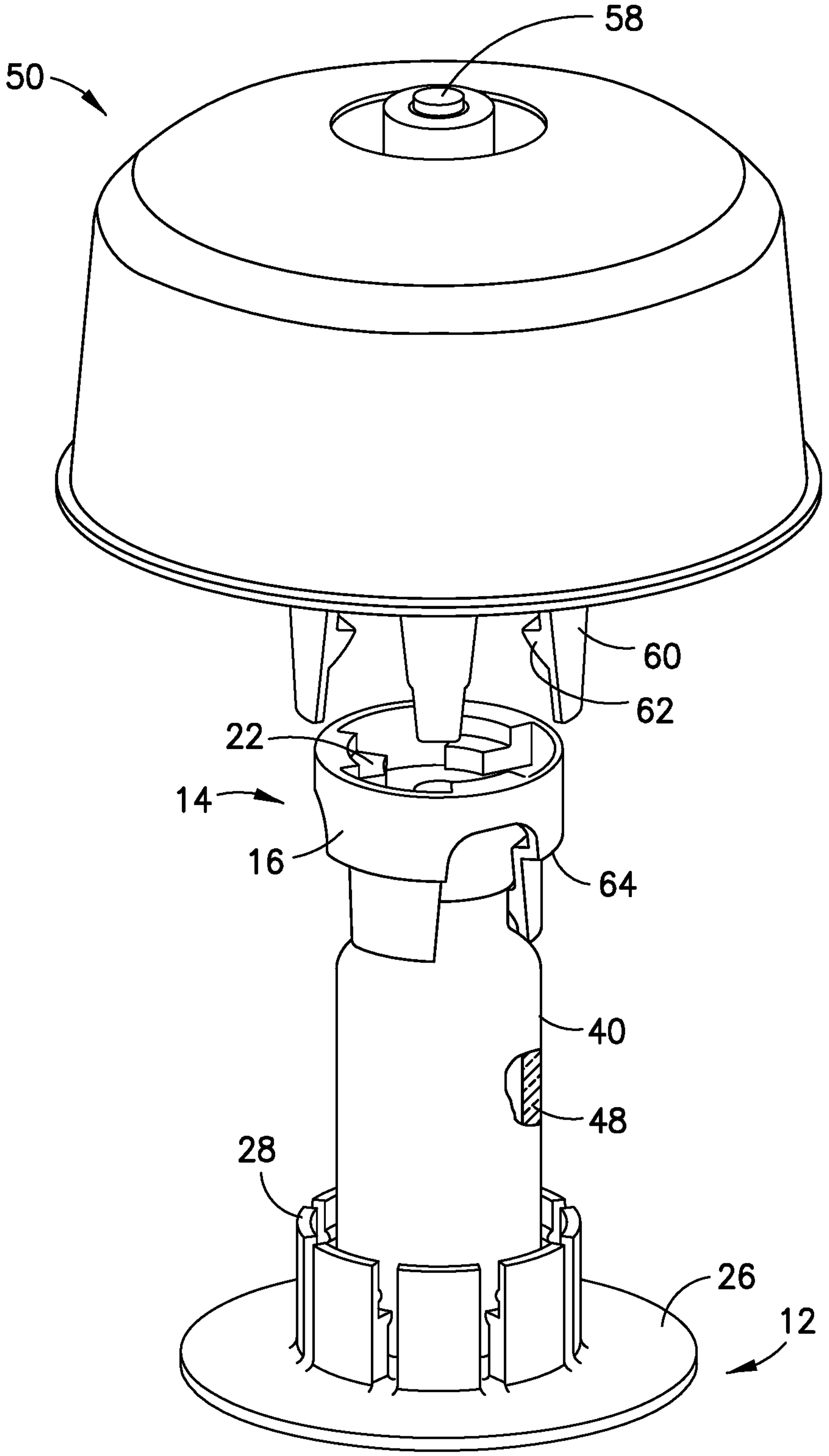
FIG. 5A is a perspective view of a vial stabilizer base and a vial adapter attached to a vial shown with a closed system transfer device positioned for attachment to the vial adapter and vial in accordance with an aspect of the present invention.
Figure 5B:
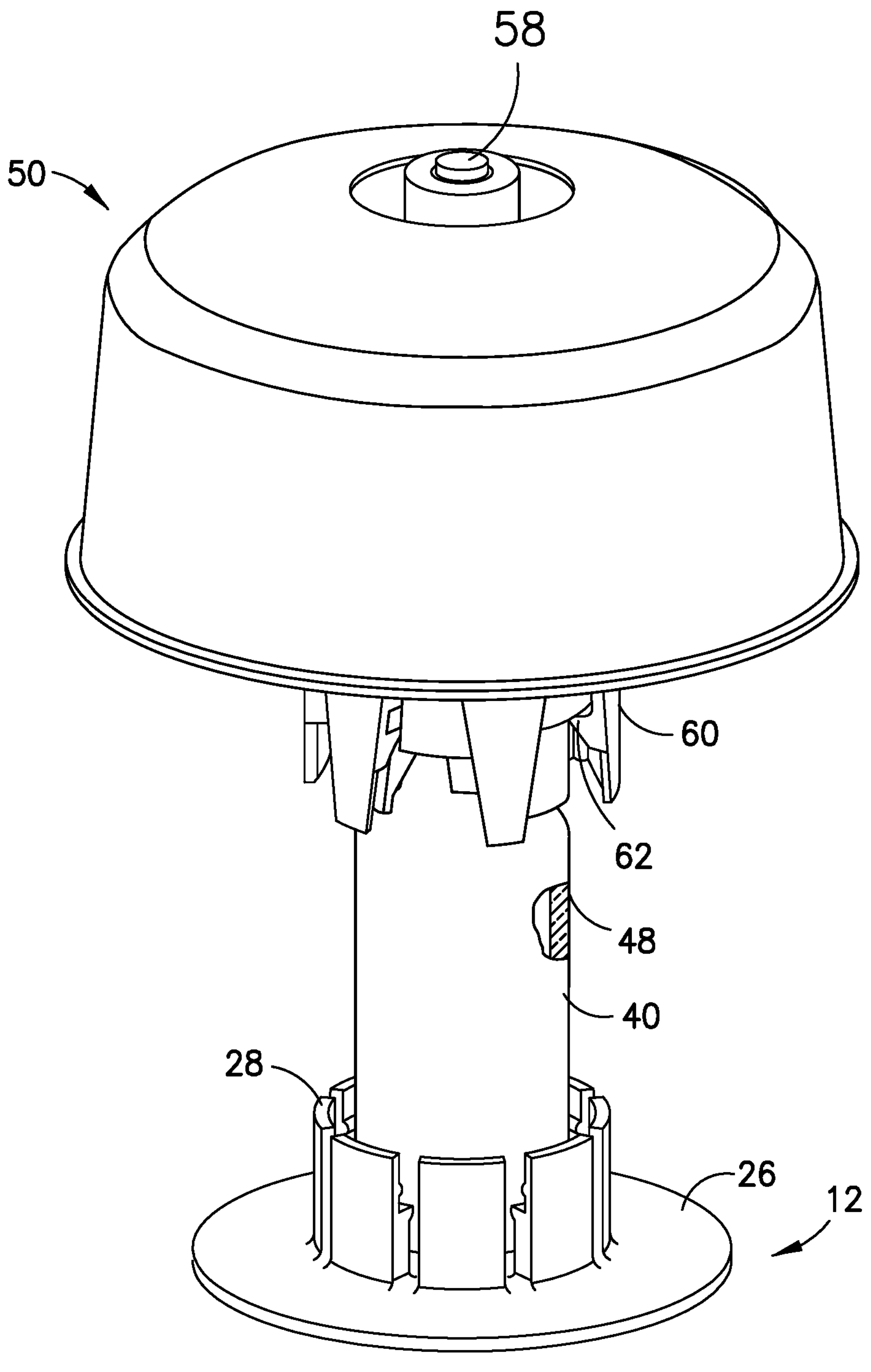
FIG. 5B is a perspective view of a vial stabilizer base and vial adapter attached to a vial with a closed system transfer device attached to the vial adapter and vial in accordance with an aspect of the present invention.
Figure 5C:
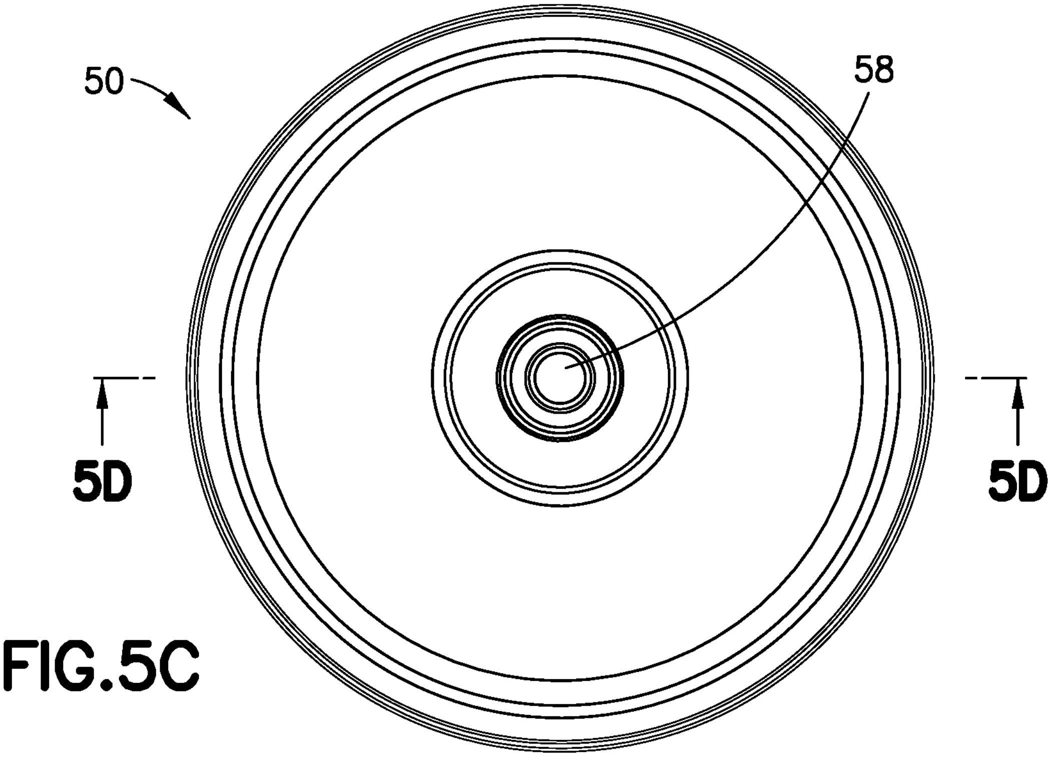
FIG. 5C is a top view of the vial stabilizer base and vial adapter shown in FIG. 5B in accordance with an aspect of the present invention.
Figure 5E:
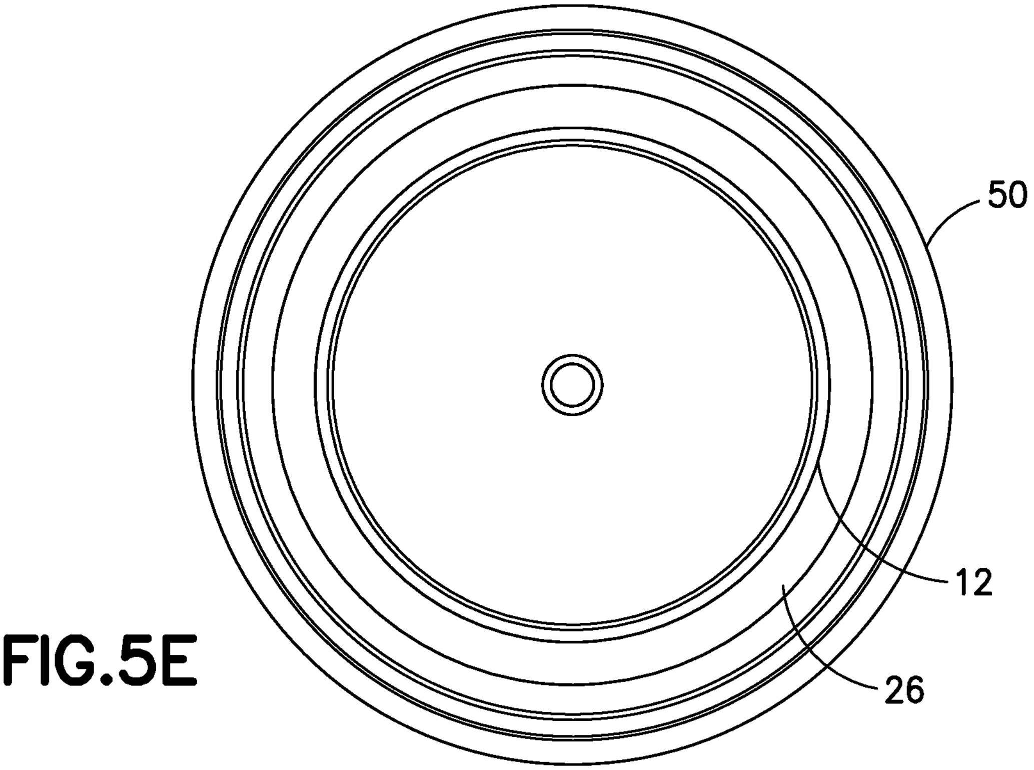
FIG. 5E is a bottom view of the vial stabilizer base and vial adapter shown in FIG. 5B in accordance with an aspect of the present invention.
Figure 5D:
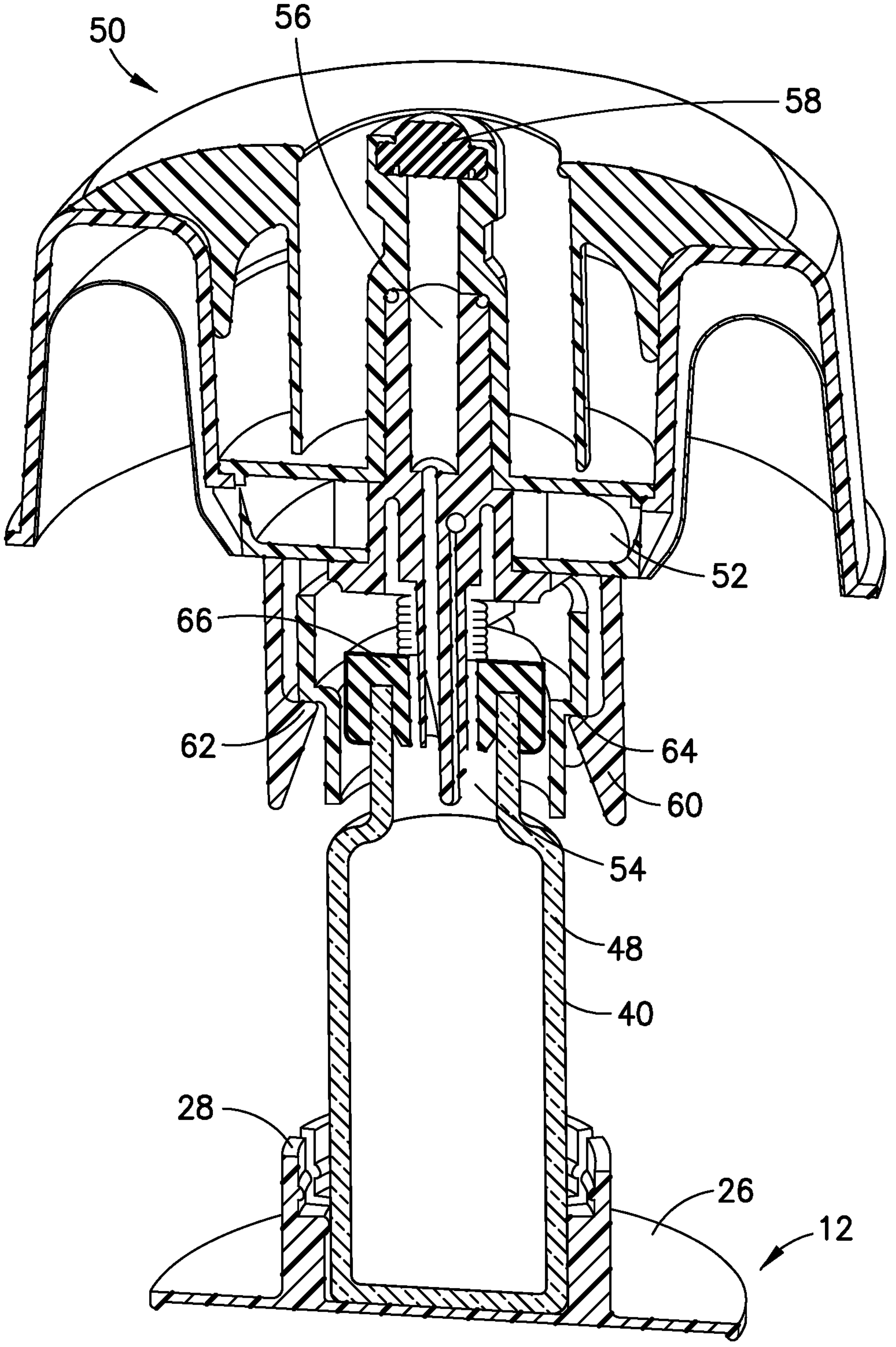
FIG. 5D is a cross-sectional view of the vial stabilizer base and vial adapter taken along line 5D-5D in FIG. 5C in accordance with an aspect of the present invention.
Figure 5F:
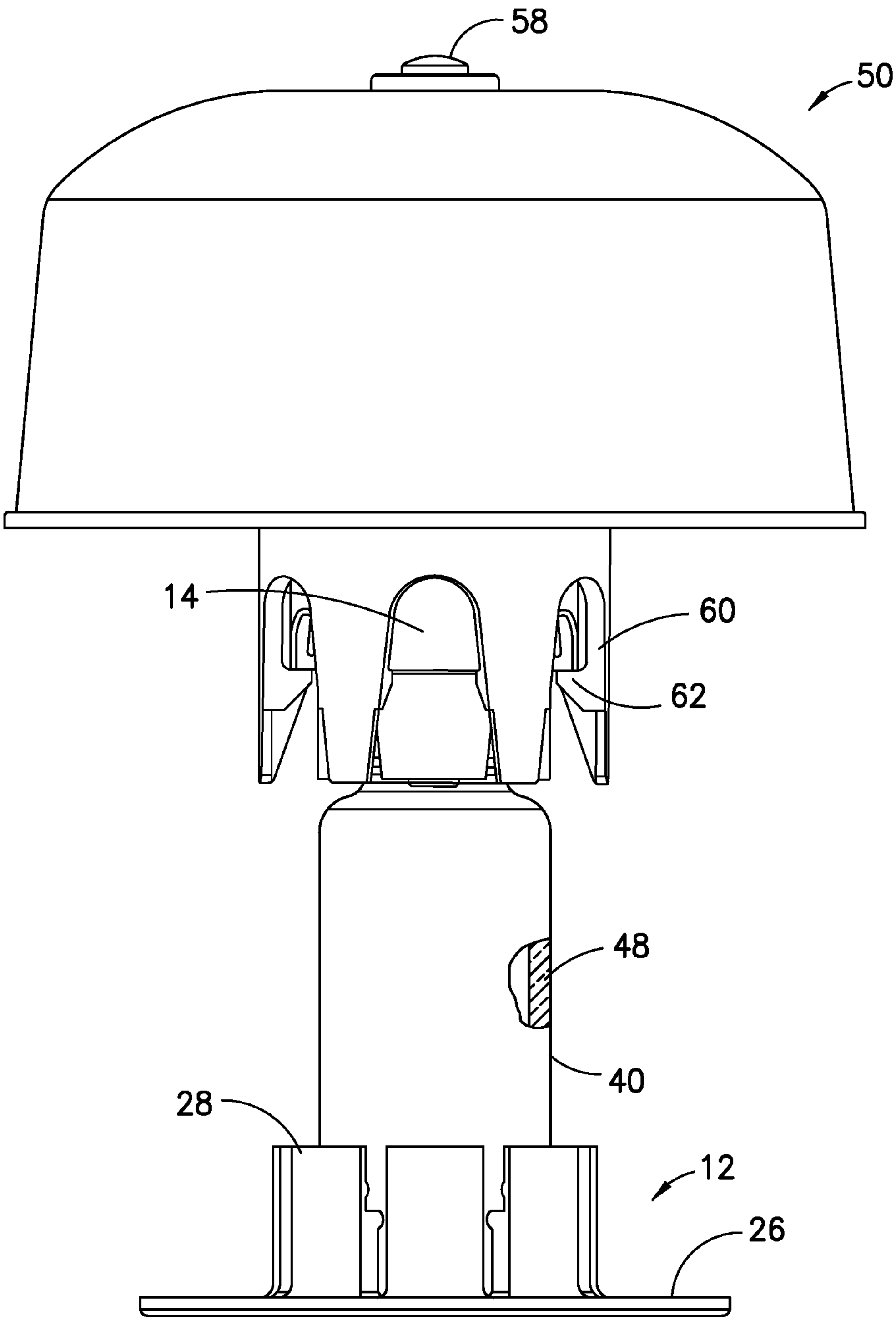
FIG. 5F is a side view of the vial stabilizer base and vial adapter shown in FIG. 5B in accordance with an aspect of the present invention.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIGS. 1A-5F, a vial stabilizer and vial adapter assembly 10 according to one aspect of the present invention includes a vial stabilizer base 12 and a vial adapter 14 as described in more detail below.

Referring to FIGS. 1A-2E, the vial adapter 14 includes a ring member 16, locking arms 18, locking tabs 20, retaining tabs 22, and a passageway 24 defined by the ring member 16. The ring member 16 is annular, although other suitable shapes for the ring member 16 may be utilized. The locking arms 18 and locking tabs 20 of vial adapter 14 are configured to securely connect to a cap 42 of medical vial 40. The medical vial 40 may contain a medicament in fluid form or powdered form that needs to be reconstituted. As shown in FIG. 2A, the locking arms 18 extend from the ring member 16 with the locking tabs 20 extending about perpendicularly from the locking arms 18. Although three locking arms 18 are provided, any other suitable number of arms may be utilized. The locking tabs 20 define an angled surface 21 that is configured to engage the cap 42 of the vial 40 and deflect the locking arms 18 radially outward to allow the vial adapter 14 to receive the vial 40 as discussed in more detail below. The retaining tabs 22 extend radially inward from the ring member 16 and are configured to abut the cap 42 of the vial 40 as discussed in more detail below.

Referring to FIGS. 1A-1D and 3A-3E, the vial stabilizer base 12 includes a foundation member 26 and gripping fingers 28 projecting from foundation member 26, which define a socket 30 with a vial seat 32 and a vial adapter seat 34. The foundation member 26 is disc-like in shape, although other suitable shapes and arrangements may be utilized for the foundation member 26. The gripping fingers 28 extend about perpendicularly from the foundation member 26. Although eight gripping fingers 28 are provided, any other suitable number of gripping fingers 28 may be provided. The gripping fingers 28 further include a vial gripping ridge 36 and a vial adapter gripping ridge 38 disposed within socket 30 and adapted to grip a vial 40 and vial adapter 14, respectively. The vial gripping ridge 36 and the vial adapter gripping ridge 38 are formed as arcuate projections extending from each of the gripping fingers 28, although other suitable arrangements for the vial gripping ridge 36 and the vial adapter gripping ridge 38 may be utilized. As discussed in more detail below, the vial seat 32 is configured to receive the vial 40 and the vial adapter seat 34 is configured to receive the vial adapter 14.

Referring to FIGS. 1A-1D, the vial stabilizer and vial adapter assembly 10 is configured to be provided to a user with the vial adapter 14 at least partially positioned within the socket 30 of the vial stabilizer base 12 with the vial adapter 14 abutting the vial adapter seat 34. The vial adapter 14 is releasably secured to the vial stabilizer base 12 via the vial adapter gripping ridge 38 of the vial stabilizer base 12. The vial adapter gripping ridge 38 engages the ring member 16 to provide a frictional and/or compressive force that releasably holds the vial adapter 14 within the vial stabilizer base 12.

Figure 7:
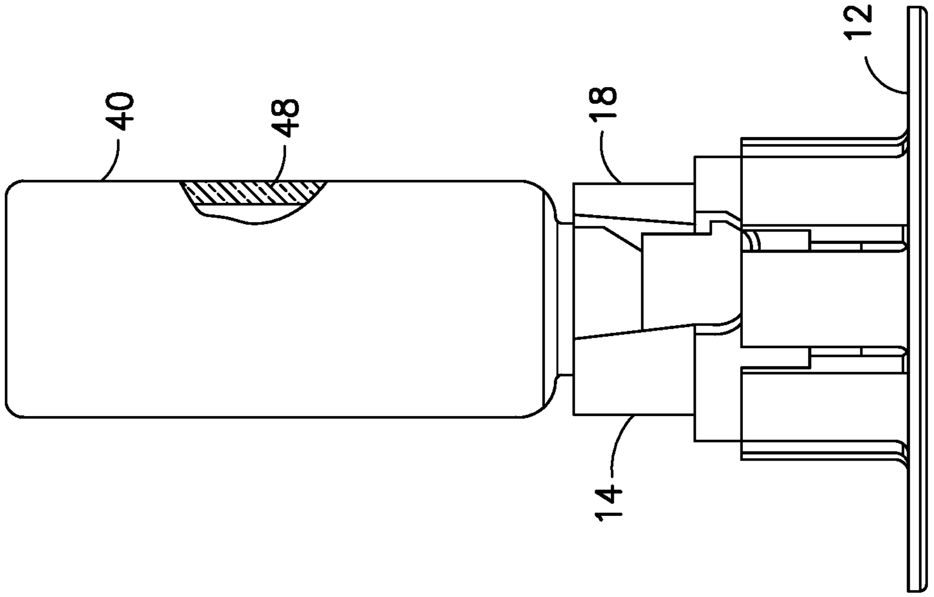
FIG. 7 is a side view of a vial connected to a vial adapter positioned in a vial stabilizer in accordance with an aspect of the present invention.
Figure 6:
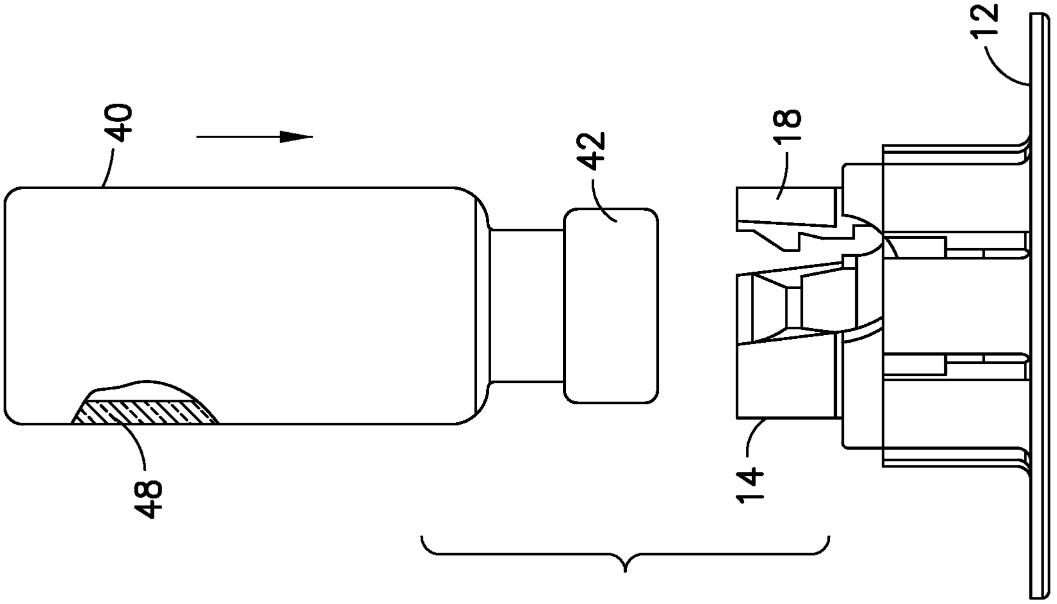
FIG. 6 is a side view showing a step of connecting a vial to a vial adapter positioned in a vial stabilizer in accordance with an aspect of the present invention.
Figure 9:
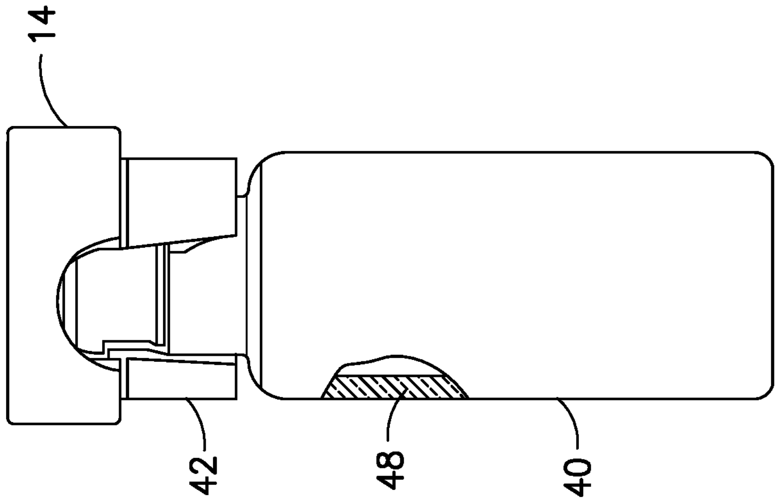
FIG. 9 is a side view of a vial connected to a vial adapter positioned cap side up in accordance with an aspect of the present invention.
Figure 8:
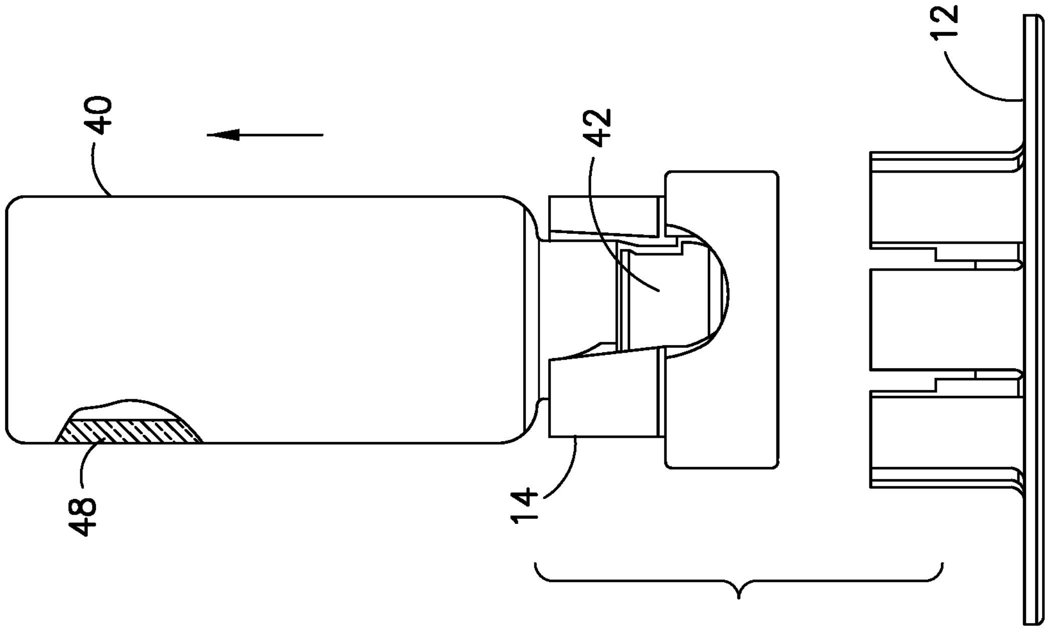
FIG. 8 is a side view of a step of removing a vial with a vial adapter attached from a vial stabilizer in accordance with an aspect of the present invention.
Figure 11:
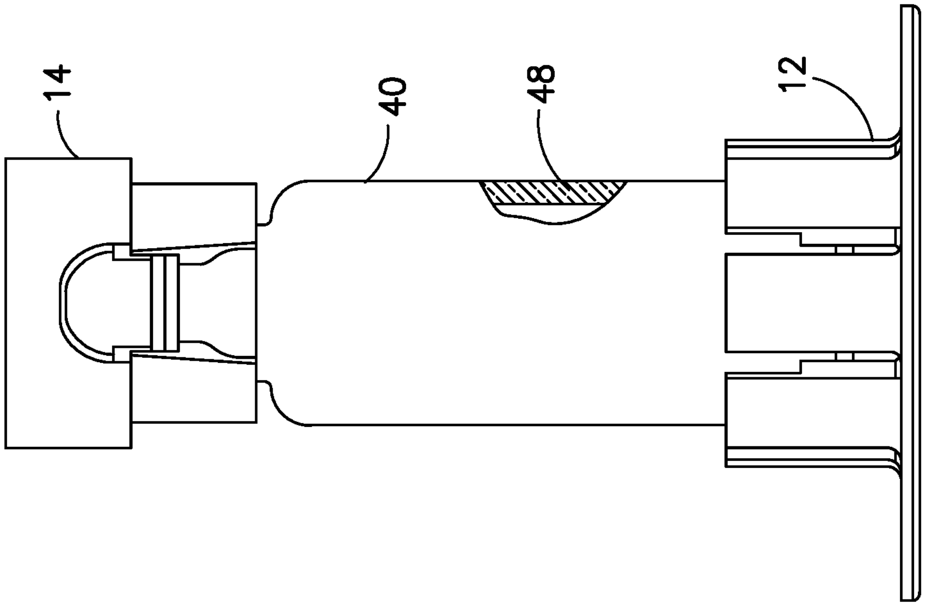
FIG. 11 is a side view of a vial connected to a vial adapter with the bottom of the vial being secured in a vial stabilizer in accordance with an aspect of the present invention.
Figure 10:
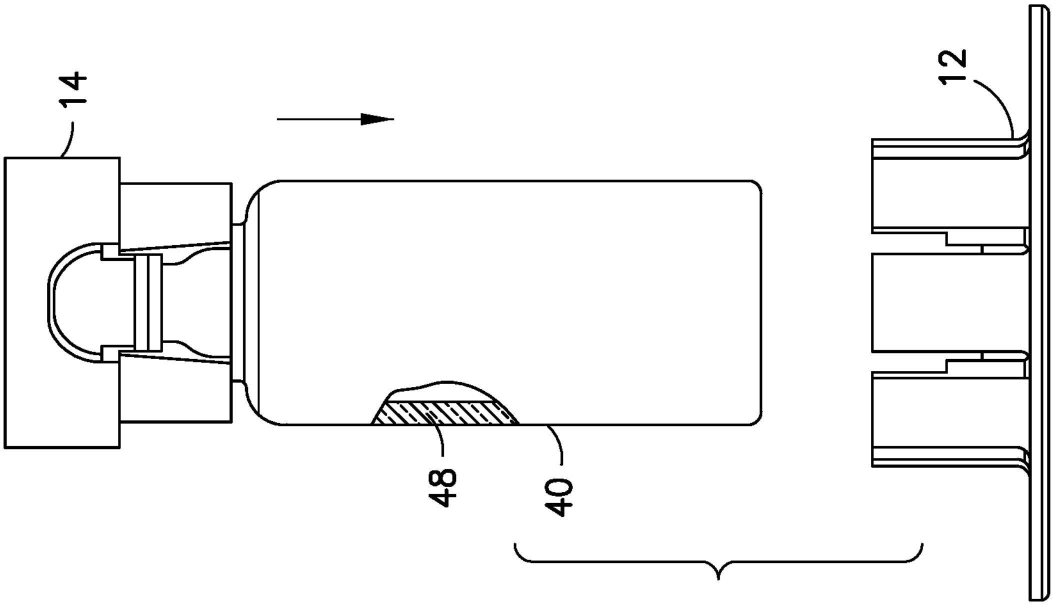
FIG. 10 is a side view of a vial connected to a vial adapter with the bottom of the vial being inserted into a vial stabilizer in accordance with an aspect of the present invention.

Referring to FIGS. 4A-11, the vial adapter 14 can be used with the vial stabilizer base 12 to aid in securing the vial adapter 14 to the vial 40 and/or to stabilize and prevent tipping of the vial 40 during transfer of the contents of the vial 40. With the vial adapter 14 releasably secured to the vial stabilizer base 12 at the vial adapter seat 34, as shown in FIG. 6, the vial 40 is positioned with the cap 42 facing downward and axially aligned with the cap 42. Next, as shown in FIG. 7, the cap 42 is pushed into the locking tabs 20 with the cap 42 engaging the angled surface 21, with locking arms 18 flexing outward as the cap 42 cams over locking tabs 20, until the cap 42 passes a locking surface 44 of locking tabs 20 and contacts a retaining surface 46 defined by the retaining tabs 22. The locking arms 18 spring inward and return to their original position and secure the vial adapter 14 to the vial 40. Once secured to the vial 40, the vial adapter 14 cannot be readily removed from the vial 40 without breaking or damaging the vial 40 or vial adapter 14, although other arrangements may be utilized where the vial adapter 14 may be releasably secured to the vial 40. As shown in FIG. 8, the vial 40 with the vial adapter 14 attached is then pulled up and out of vial stabilizer base 12. The vial 40 with vial adapter 14 attached is then rotated so that the cap 42 faces upward as shown in FIG. 9. As shown in FIGS. 10 and 11, the vial 40 is then pushed down into the socket 30 of the vial stabilizer base 12 so that a vial wall 48 of the vial 40 contacts the vial seat 32 and the vial gripping ridge 36. In particular, the vial gripping ridge 36 engages the vial wall 48 to provide a frictional and/or compressive force that releasably holds the vial 40 within the vial stabilizer base 12.

Referring to FIGS. 4A-5F, the vial 40 is stabilized via the vial stabilizer base 12 with the vial adapter 14 attached to the vial 40, and the vial 40 is ready for attachment to a closed system transfer device 50. The vial adapter 14 is configured to allow the closed system transfer device 50 to be secured to vials of various sizes. In particular, the closed system transfer device 50 typically is only configured to be secured to a single vial size and would be too large to accept the size of the vial 40. The vial adapter 14, however, allows the closed system transfer device 50 to be secured to a smaller sized vial, such as the vial 40. For example, the vial adapter 14 may be configured to enable attachment of a 13 mm vial to a closed system transfer device configured to receive a 20 mm vial, although various size vial adapters are envisioned to accommodate a variety of vial sizes and a variety of closed system transfer device sizes.

Referring more particularly to FIGS. 5A-5F, the closed system transfer device 50 includes a pressure equalization system 52, a piercing spike 54, a fluid passageway 56, a syringe septum 58, and snap fit arms 60. However, other suitable devices could be used with the vial stabilizer and vial adapter assembly 10. The closed system transfer device 50 is attached to the vial 40 with the vial adapter 14 by pushing the snap fit arms 60 over the vial adapter 14 until snap fit tabs 62 of the snap fit arms 60 securely engage a locking ridge 64 disposed about the ring member 16 of the vial adapter 14. During the attachment of the closed system transfer device 50 to the vial 40, the piercing spike 54 passes through passageway 24 of vial adapter 14 and pierces a vial septum 66 disposed in the vial cap 42 enabling fluid communication between the interior of the vial 40 and the fluid passageway 56, which allows fluid to be transferred via syringe (not shown) or syringe adapter (not shown) at a septum 58 of the closed system transfer device 50.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system, comprising:

a vial stabilizer base comprising a foundation member and a plurality of gripping fingers, wherein the plurality of gripping fingers project annularly from the foundation member; and a vial adapter configured to be secured to a medical vial, wherein the plurality of gripping fingers of the vial stabilizer base define a socket having a first seat configured to receive the medical vial and a second seat configured to receive the vial adapter, and wherein the first seat and the second seat are arranged perpendicularly to a direction of projection of the plurality of gripping fingers.

2. The system of claim 1, wherein each of the plurality of gripping fingers comprises a first gripping ridge configured to grip the medical vial, and a second gripping ridge configured to grip the vial adapter.

3. The system of claim 2, wherein the first gripping ridge and the second gripping ridge each extend radially inward from each of the plurality of gripping fingers.

4. The system of claim 3, wherein the first gripping ridge is positioned further radially inward relative to the second gripping ridge.

5. The system of claim 1, wherein the plurality of gripping fingers projecting from the foundation member are elastically deformable.

6. The system of claim 1, wherein the plurality of gripping fingers are spaced radially inward from a circumferential edge of the foundation member.

7. The system of claim 1, wherein the vial adapter comprises an annular ring member, a plurality of locking arms projecting from the annular ring member, and a passageway defined by the annular ring member.

8. The system of claim 7, wherein the vial adapter further comprises at least one retaining tab extending radially inward from the annular ring member and configured to engage the medical vial.

9. The system of claim 7, wherein the plurality of locking arms projecting from the annular ring member are configured to engage the medical vial.

10. The system of claim 7, wherein the plurality of locking arms projecting from the annular ring member are elastically deformable.

11. The system of claim 7, wherein the plurality of locking arms projecting from the annular ring member each comprise an angled surface configured to form a snap fit with the medical vial.

12. The system of claim 1, wherein the vial adapter is configured to enable attachment of the medical vial having a first size to a closed system transfer device configured to attach to a separate medical vial having a second size.

13. The system of claim 12, wherein the first size is smaller than the second size.

14. A vial stabilizer and vial adapter assembly comprising:

a vial stabilizer base comprising:

a first body, and a plurality of fingers projecting from the first body, the plurality of fingers annularly disposed about the first body and defining a socket having a first seat configured to receive a vial and a second seat disposed within the interior of the socket, wherein the first seat and the second seat are arranged perpendicularly to a direction of projection of the plurality of fingers; and a vial adapter configured to be secured to a medical vial comprising a second body and a plurality of arms projecting from the second body, the second body defining a passageway, wherein the vial adapter is at least partially received within the socket of the vial stabilizer base and engaged with the second seat of the vial stabilizer base.

15. The assembly of claim 14, wherein the plurality of arms projecting from the second body are configured to engage a vial.

16. The assembly of claim 14, wherein the plurality of arms projecting from the second body are elastically deformable.

17. The assembly of claim 14, wherein the plurality of fingers projecting from the first body comprise a first gripping ridge configured to grip a vial, and a second gripping ridge engaged with the vial adapter and releasably securing the vial adapter to the vial stabilizer base.

18. The assembly of claim 17, wherein the first gripping ridge and the second gripping ridge each extend radially inward from at least one of the plurality of fingers projecting from the first body.

19. The assembly of claim 17, wherein the first gripping ridge is positioned further radially inward relative to the second gripping ridge.

20. The assembly of claim 14, wherein the vial adapter further comprises at least one retaining tab extending radially inward from the second body and configured to engage a vial.

* * * * *